(12) United States Patent
Muehlegger

(10) Patent No.: US 11,371,574 B2
(45) Date of Patent: Jun. 28, 2022

(54) FRICTION DISC OR CLUTCH DISC

(71) Applicant: Miba Frictec GmbH, Laakirchen (AT)

(72) Inventor: Markus Muehlegger, Pinsdorf (AT)

(73) Assignee: Miba Frictec GmbH, Laakirchen (AT)

(*) Notice: Subject to any disclaimer, the term of this patent is extended or adjusted under 35 U.S.C. 154(b) by 0 days.

(21) Appl. No.: 17/267,125

(22) PCT Filed: Aug. 21, 2019

(86) PCT No.: PCT/AT2019/060264
§ 371 (c)(1),
(2) Date: Feb. 9, 2021

(87) PCT Pub. No.: WO2020/037345
PCT Pub. Date: Feb. 27, 2020

(65) Prior Publication Data
US 2021/0310533 A1    Oct. 7, 2021

(30) Foreign Application Priority Data

Aug. 21, 2018   (AT) ................................. A50710/2018

(51) Int. Cl.
*F16D 69/04* (2006.01)
*F16D 13/64* (2006.01)
(Continued)

(52) U.S. Cl.
CPC ....... *F16D 69/0408* (2013.01); *F16D 13/648* (2013.01); *F16D 13/52* (2013.01);
(Continued)

(58) Field of Classification Search
CPC .................. F16D 13/52; F16D 13/644; F16D 69/04–0416; F16D 2013/642;
(Continued)

(56) References Cited

U.S. PATENT DOCUMENTS 2,207,961 A * 7/1940 Wellman ................. F16D 13/64
192/107 C
2,447,017 A * 8/1948 Kearby .................... B01J 23/24
502/307
(Continued)

FOREIGN PATENT DOCUMENTS

DE        100 35 518 A1    2/2001
DE         10125628 A1 *   9/2002   ............ F16D 13/72
(Continued)

OTHER PUBLICATIONS

International Search Report in PCT/AT2019/060264, dated Dec. 5, 2019.

*Primary Examiner* — Ernesto A Suarez
*Assistant Examiner* — Lillian T Nguyen
(74) *Attorney, Agent, or Firm* — Collard & Roe, P.C.

(57) ABSTRACT

A friction device has a carrier element and friction lining segments arranged thereon. The friction lining segments each include a sintered friction lining, which is arranged on a friction lining carrier, the friction lining carrier is connected to the carrier element, and preferably the carrier element includes multiple fastening lugs and/or lining spring elements for the friction lining segments. In the design of the carrier element with the fastening lugs and/or lining spring elements, the friction lining segments each connect two fastening lugs or two lining spring elements to one another and/or the friction lining segments have an angle coverage between 25° and 55°.

9 Claims, 5 Drawing Sheets

Figure 1:
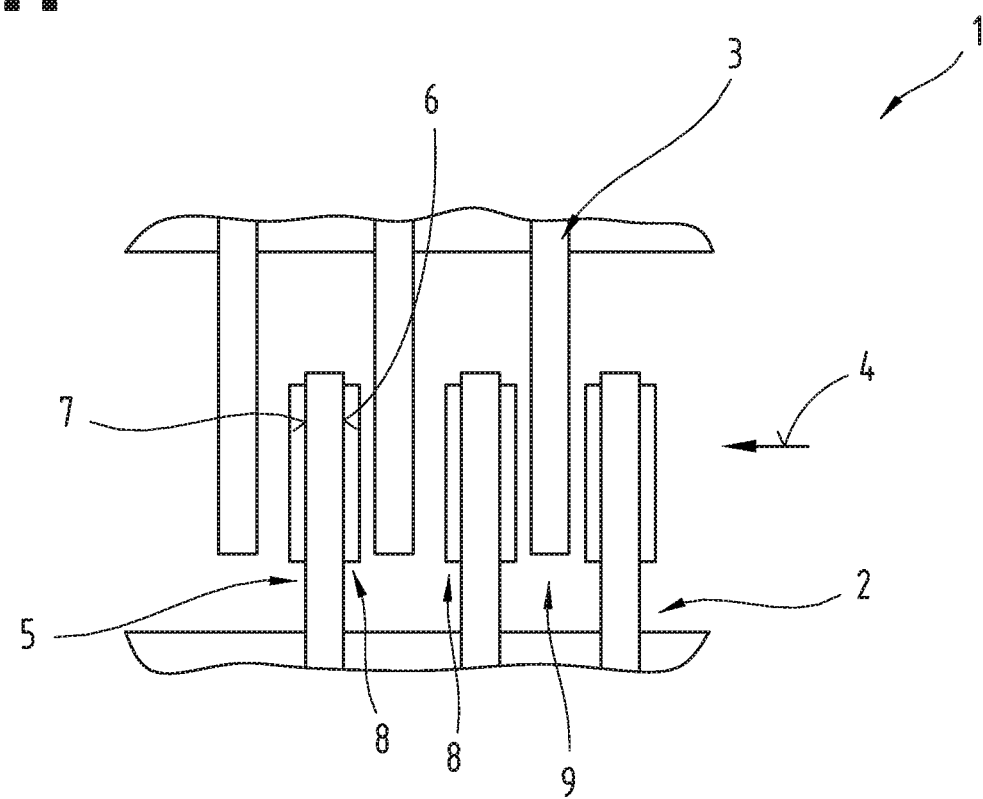

(51) Int. Cl.
*F16D 13/52* (2006.01)
*F16D 69/00* (2006.01)

(52) U.S. Cl.
CPC .. *F16D 2069/004* (2013.01); *F16D 2069/009* (2013.01); *F16D 2069/0483* (2013.01)

(58) Field of Classification Search
CPC .. F16D 2069/009; F16D 13/683; F16D 13/68; F16D 13/642; F16D 13/64–69
See application file for complete search history.

(56) References Cited

U.S. PATENT DOCUMENTS

| | | | |
|---|---|---|---|
| 2,767,817 A * | 10/1956 | Davis | F16D 69/0408 |
| | | | 192/107 R |
| 3,403,759 A | 10/1968 | Holcomb, Jr. | |
| 3,605,968 A | 9/1971 | Ely | |
| 4,377,225 A | 3/1983 | Lech, Jr. et al. | |
| 4,941,558 A * | 7/1990 | Schraut | F16D 13/64 |
| | | | 192/107 C |
| 5,048,659 A * | 9/1991 | Tojima | F16D 13/64 |
| | | | 192/107 C |
| 5,174,426 A | 12/1992 | Thirion de Briel et al. | |
| 5,355,985 A | 10/1994 | Thirion De Briel et al. | |
| 10,197,107 B2 * | 2/2019 | Muehlegger | F16D 13/64 |
| 10,197,108 B2 | 2/2019 | Basiewicz et al. | |
| 2016/0258493 A1 | 9/2016 | Kobayashi et al. | |

FOREIGN PATENT DOCUMENTS

| | | | |
|---|---|---|---|
| DE | 101 54 668 A1 | 5/2003 | |
| DE | 103 52 427 A1 | 6/2004 | |
| FR | 2677092 A1 | 12/1992 | |
| GB | 1103769 A | 2/1968 | |
| WO | 2015/149100 A2 | 10/2015 | |
| WO | WO-2015149100 A2 * | 10/2015 | F16D 13/64 |

* cited by examiner

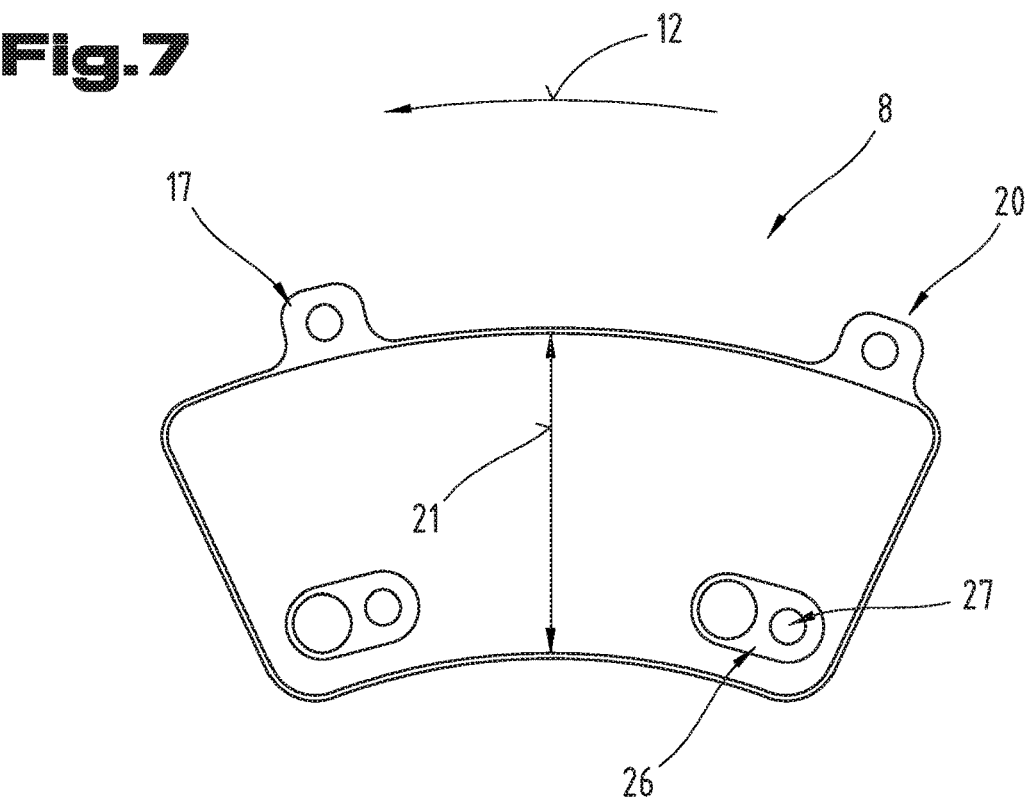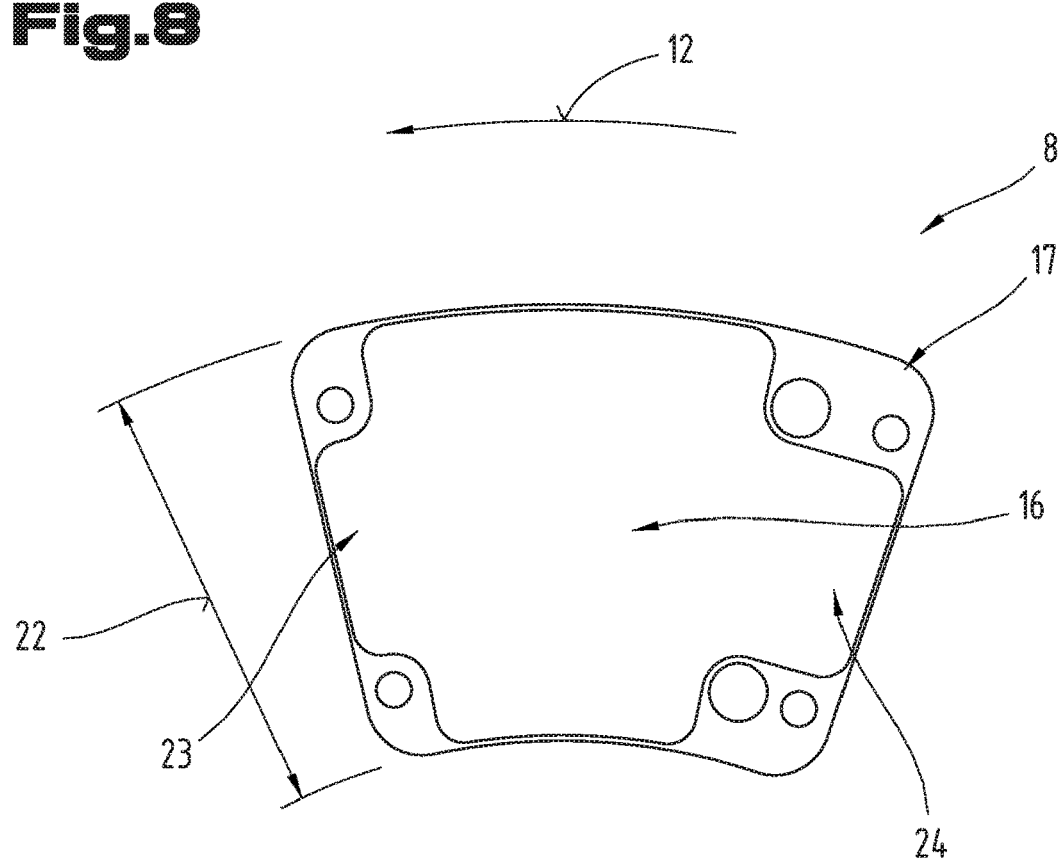

FRICTION DISC OR CLUTCH DISC

CROSS REFERENCE TO RELATED APPLICATIONS

This application is the National Stage of PCT/AT2019/060264 filed on Aug. 21, 2019, which claims priority under 35 U.S.C. § 119 of Austrian Application No. A50710/2018 filed on Aug. 21, 2018, the disclosure of which is incorporated by reference. The international application under PCT article 21(2) was not published in English.

The invention relates to a friction device having a carrier element and friction lining segments arranged thereon, wherein the friction lining segments each comprise a sintered friction lining which is arranged on a friction lining carrier, said friction lining carrier being connected to the carrier element, and the carrier element comprising multiple fastening lugs and/or lining spring elements for the friction lining segments.

The invention further relates to a package of friction devices comprising friction devices in the form of outer discs and inner discs arranged alternately in an axial direction.

It is known to produce friction linings for friction discs of clutches or clutch discs from organic materials, such as resin-bonded fibrous materials, or inorganic materials, such as sintering materials. Friction linings of sintering material have the advantage over friction linings of organic materials that they have a higher wear resistance, temperature resistance and friction coefficient consistency. However, so far, it was not possible to use inorganic friction linings in an organic basic structure of a friction disc or clutch disc, i.e. a friction disc or clutch disc that is designed to accommodate organic friction linings. This is mainly due to the geometry of the respective standard linings. The currently usually used sintered friction lining cannot be mounted on a carrier element for organic friction linings.

It is the object of the invention to create a new possibility of using a carrier element for organic friction linings.

The object of the invention is achieved in that the friction lining segments each connect two fastening lugs or lining spring elements to one another and/or that the friction lining segments have an angle coverage between 25° and 55°.

The object of the invention is further achieved by the initially mentioned package of friction devices in which at least one of the friction devices is designed according to the invention.

The object of the invention is further achieved by the use of a sintered friction lining in a friction device for organic friction linings.

By the friction lining segments having an angle coverage between 25° and 55°, it is possible that the friction lining segments are mounted on the carrier element at those position which are provided for organic friction linings as a standard. This makes it possible to replace (used) organic friction linings with new sintered friction linings in friction devices equipped with organic friction linings as a standard during service or repair work on (multi-disc) clutches or multi-disc brakes without any major problems or conversions and thus to utilize their advantages in such clutches or brakes as well. Due to the angle coverage, corresponding fastening points can be provided in the sintered friction linings which are also suitable for mounting the friction linings in an "organic" basic structure. In the alternative or in addition to this, the fastening points can also be designed and/or arranged such that with each of the friction linings, two fastening lugs or lining spring elements are connected to one another, whereby the fastening of the friction linings additionally has a springy effect. However, hence, it is also possible to downsize the fastening lugs or lining spring elements whereby mass in the region of the carrier element can be saved favoring more mass in the region of the friction linings, whereby the friction linings can have a longer lifespan.

According to an embodiment variant of the friction device, it can be provided that a continuous ring element is formed of the friction lining segments and the fastening lugs or lining spring elements. Hence, a stiffening of the friction lining segments can be achieved, wherein a certain elasticity of the entire ring element is maintained by the fastening lugs and/or lining spring elements.

So as to allow for easier replacement of the organic friction linings by the sintered friction linings, according to a further embodiment variant of the friction device, it can be provided that the friction lining carriers have fastening lugs, on which no friction linings are arranged, and/or that the friction lining carriers and/or the friction linings have recesses and/or that the friction linings have an areal extent which is at least 5% smaller than the areal extent of the friction lining carriers, in each case as viewed from the top and/or that the friction linings are provided with lug-like regions projecting in the circumferential direction. Hence, the mass moment of inertia of the sintered friction linings in operation with respect to the desired lifespan (wear) can be easily reduced, designed equally or be increased, such that the respective behavior can be better adapted to that of organic friction linings.

According to another embodiment variant of the friction device, it can be provided that the friction lining carriers have multiple bores, wherein at least one of the bores has a diameter differing from that of the remaining bores. Hence, the temperature distribution in friction contact can be "controlled", e.g. also with regard to damage such as hot spots or thermally caused surface cracks or thermally caused deformations of the clutch contact plate or the flywheel. Moreover, hence, the friction lining segments can be adapted to different fastening situations more easily.

For the purpose of better understanding of the invention, it will be elucidated in more detail by means of the figures below.

Figure 2:
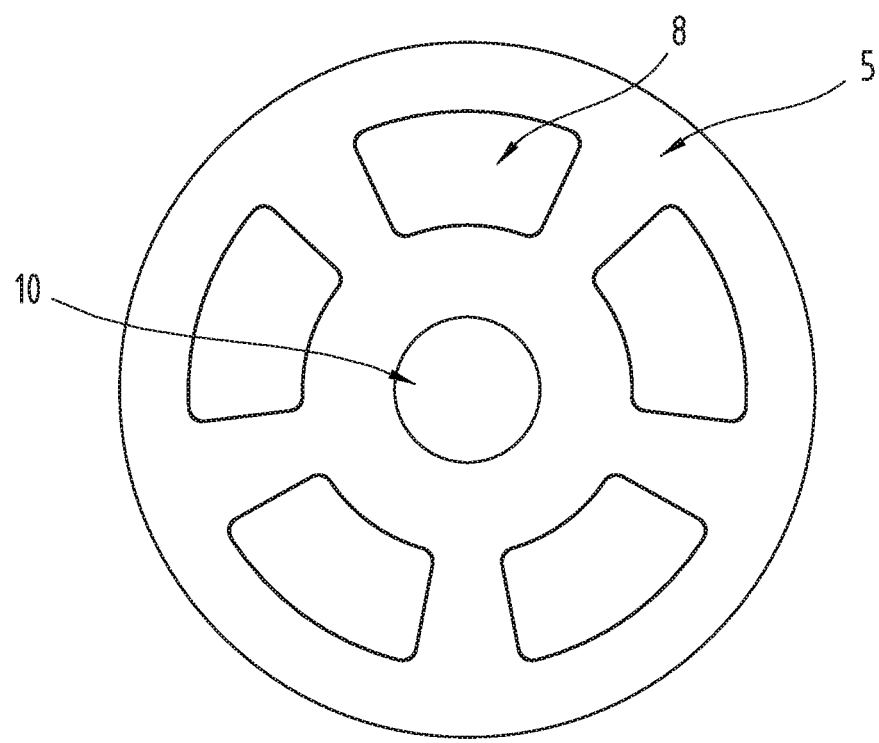
Figure 3:
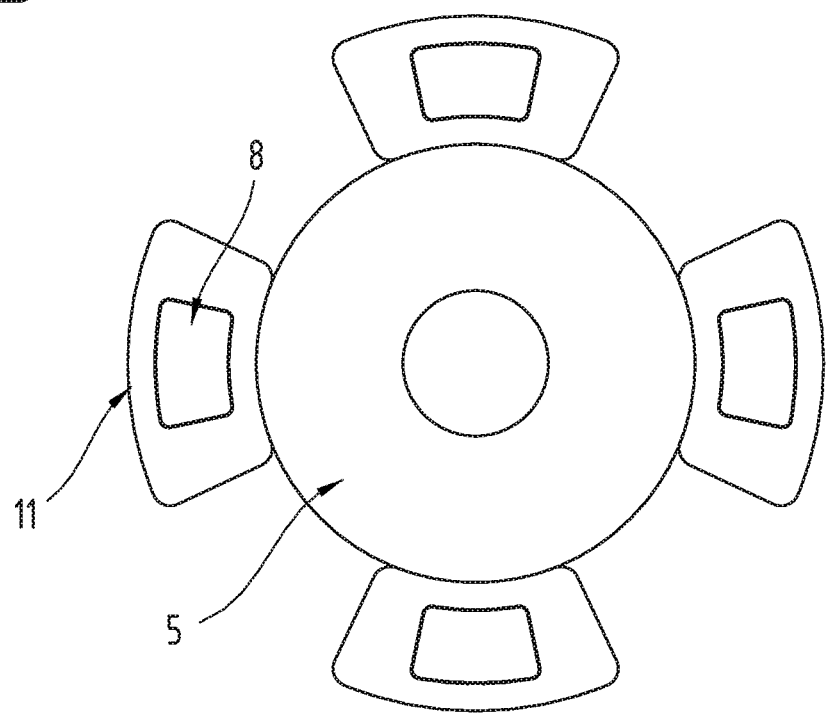
Figure 4:
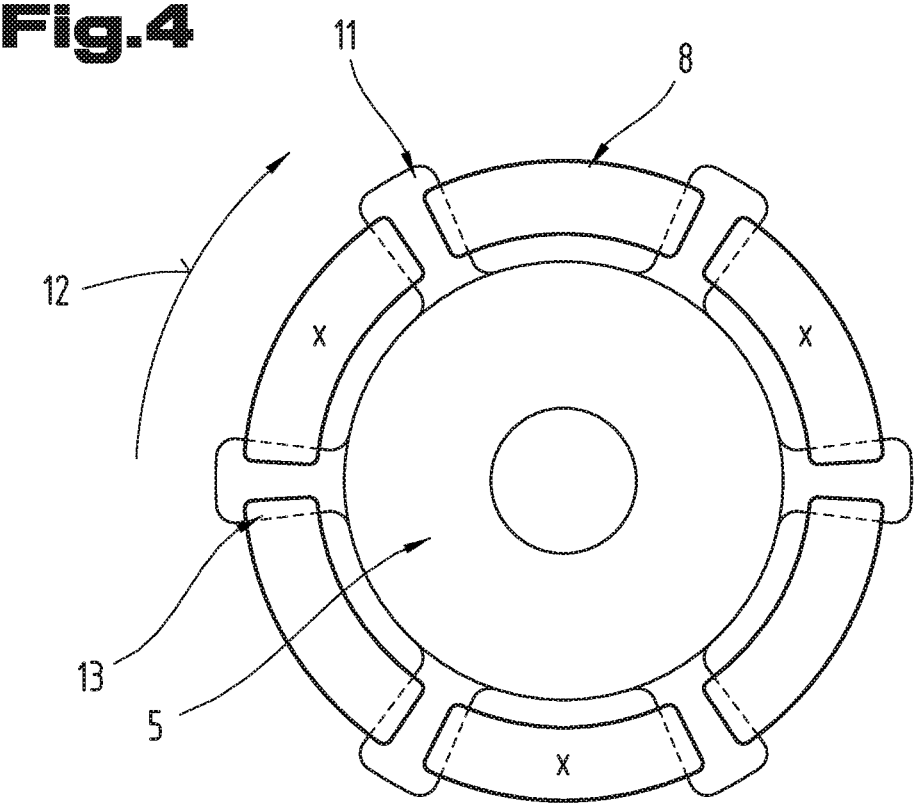
Figure 5:
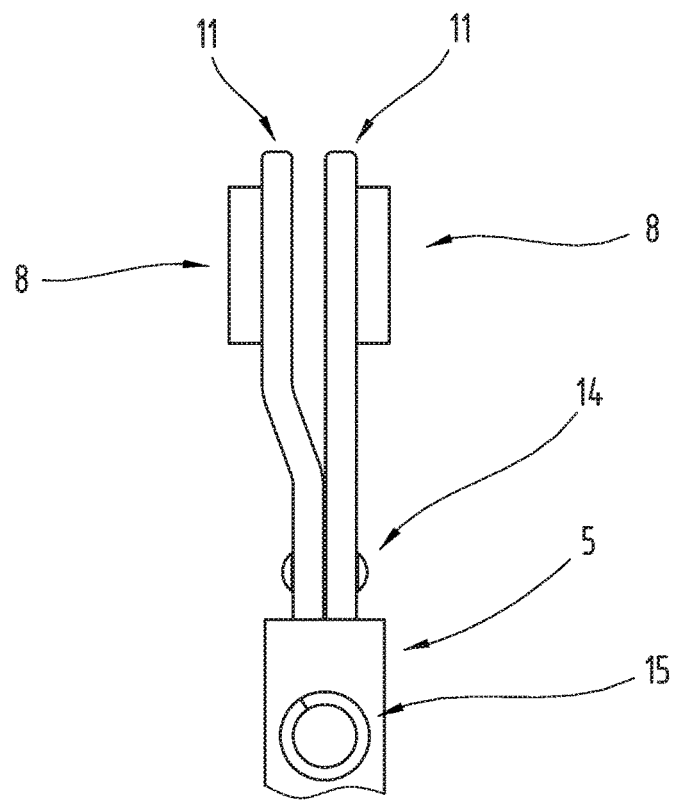
Figure 6:
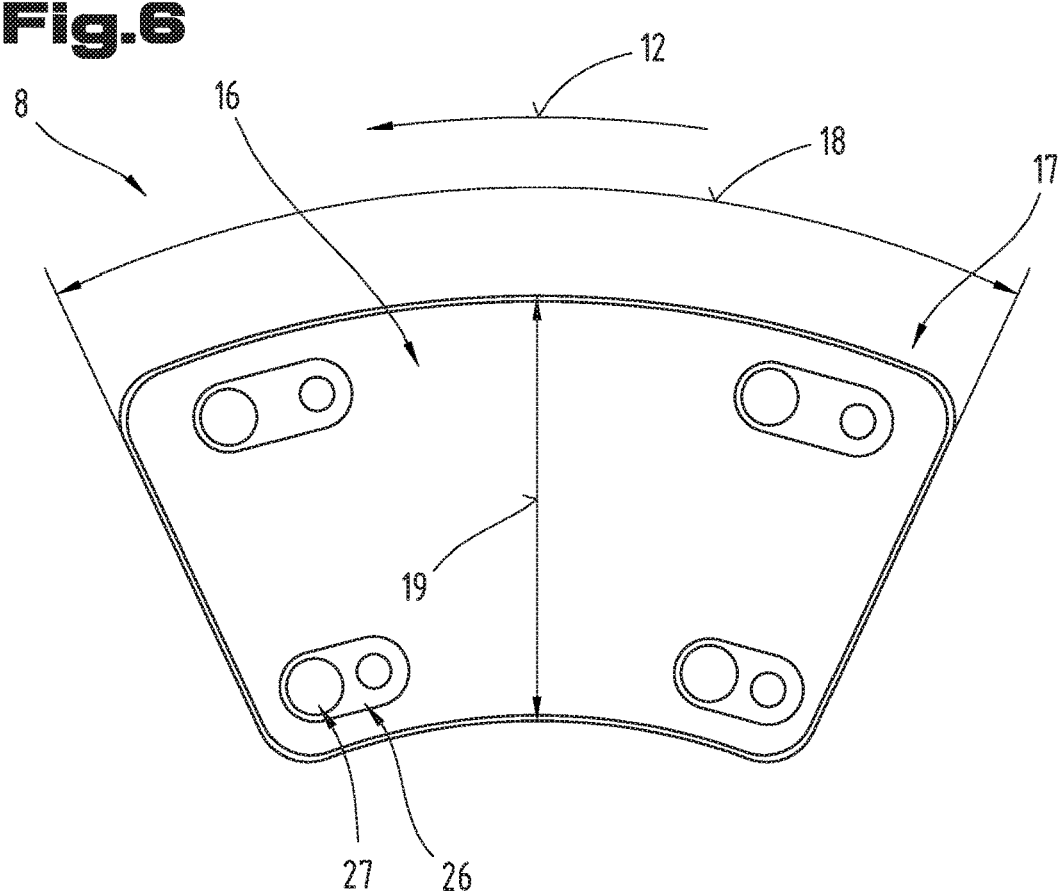
Figure 9:
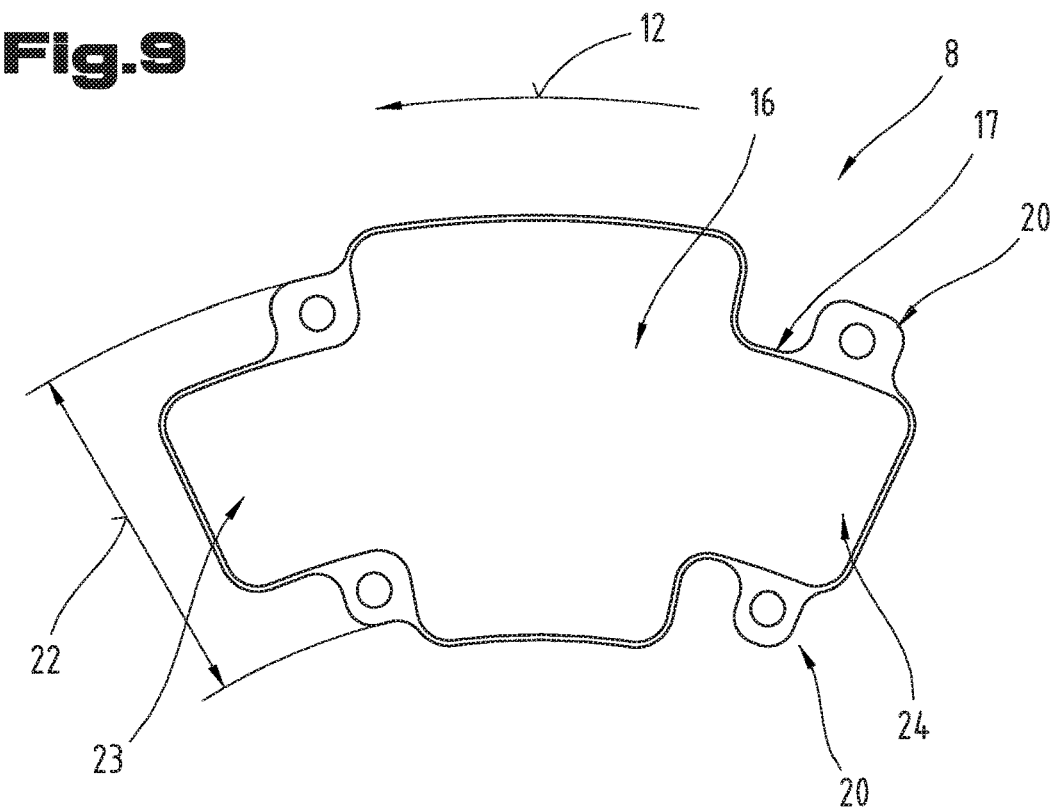
Figure 10:
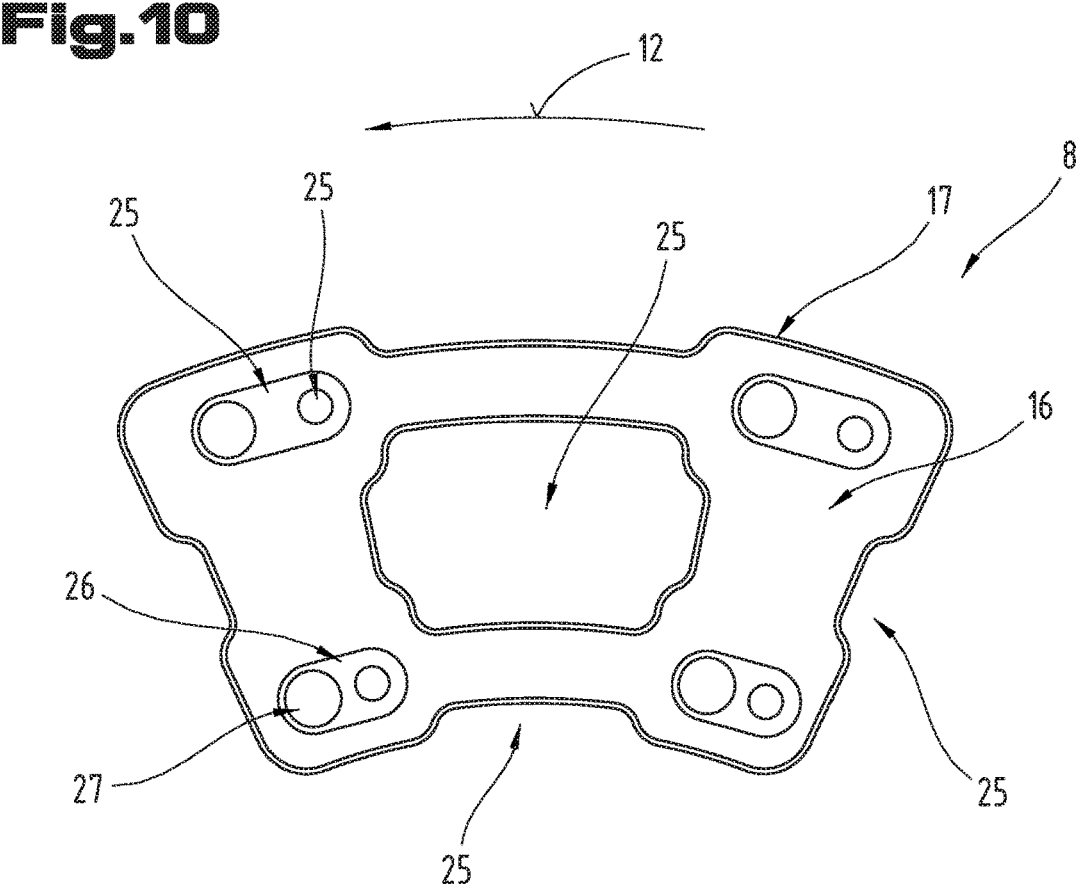

These show in a simplified schematic representation:

FIG. 1 a cutout from a package of friction devices in a side view;

FIG. 2 a first embodiment variant of a friction device;

FIG. 3 a second embodiment variant of a friction device;

FIG. 4 a third embodiment variant of a friction device;

FIG. 5 a cutout from a fourth embodiment variant of a friction device;

FIG. 6 a first embodiment variant of a friction lining segment;

FIG. 7 a second embodiment variant of a friction lining segment;

FIG. 8 a third embodiment variant of a friction lining segment;

FIG. 9 a fourth embodiment variant of a friction lining segment;

FIG. 10 a fifth embodiment variant of a friction lining segment.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a cutout from a package 1 of a friction device. The package 1 comprises multiple inner discs 2 and multiple outer discs 3, which can also be referred to as friction devices. The inner discs 2 are arranged in an axial direction 4 alternating with the outer discs 3. Via a corresponding confirmation mechanism, the inner discs 2 are adjustable relative to the outer discs 3 in the axial direction 4, such that a frictional engagement is established between the inner discs 2 and the outer discs 3.

The inner discs 2 have a carrier element 5 which can be at least partially designed as an at least approximately flat, annular carrier disc. The carrier element 5 comprises a first surface 6 and a second surface 7 opposite thereto in the axial direction 4. Multiple friction lining segments 8 are arranged on at least one of the first surface 6 or second surface 7, preferably on both. In the embodiment variant shown, the inner discs 2 are so-called lining discs.

The outer discs 3 have a disc body 9, which can be designed at least partially as a flat, at least approximately annular disc, and which is free of friction lining segments 8 in the shown embodiment variant. Thus, the outer discs 3 are the so-called counter discs, which can be brought into frictional engagement with the friction lining segments 8 of the inner discs 2. However, it is also possible that the friction lining segments 8 are arranged on the outer discs 3, in particular if no friction lining segments 8 are arranged on the inner discs 2. In this case, the disc body 9 also forms a carrier element 5.

Preferably, the carrier element 5 of the inner disc 2 and/or the disc body 9 of the outer disc 3 consists of and/or comprises a steel. However, these can also consist of another suitable, in particular metallic, material, for example of a sintered material.

This general structure of the package 1 of friction devices is known from the prior art. As regards further details, reference is thus made to the relevant prior art.

The package 1 is part of a (disc) friction system, for example a (wet-running) (multi-disc) clutch, a brake, a holding device, a differential lock etc.

Below, merely the friction device will be addressed. Depending on the design of the package 1, this friction device can be an inner disc 2 and/or an outer disc 3, as was described above.

It should be noted already at this point that the term friction device comprises both a friction disc per se and a clutch disc. Thus, the friction device can be a friction disc or a clutch disc.

As shown in the representation in FIG. 2, the carrier element 5 can be at least one flat disc on which the friction lining segments 8 are mounted. The sole recess which the carrier element 5 has is a central bore 10 to allow for the friction device to be arranged in the package 1, for example on a shaft and/or a tappet.

At this point, it should be noted that both the inner disc 2 and the outer disc 3 are preferably designed having drivers in order to be able to arrange the inner disc 2 and/or the outer disc 3 in the package 1 in a manner secured against rotation, as is known per se. For this purpose, the inner disc 2 can have an internal toothing in the bore 10. The outer disc can be at least partially provided with an external toothing on the outer circumference of the disc body 9. However, other drivers (toothings) are known as well; of course, these can also be used on the friction device.

According to another embodiment variant of the friction device, it is also possible that multiple fastening lugs 11 are arranged distributed, in particular distributed uniformly, across the outer circumference of the carrier element 5, as can be seen in FIG. 3. The friction lining segments 8 are arranged on these fastening lugs 11, wherein depending on the size of the fastening lugs 11 one or multiple friction lining segments 8 can be arranged per fastening lug 11.

The fastening lugs 11 can be designed as one piece with the rest of the carrier element 5. However, it is also possible to produce the fastening lugs 11 as separate components and to connect, for example rivet, them to the rest of the carrier element 5, i.e. the inner ring, as can be seen from FIG. 3.

According to an embodiment variant of the friction device, it can be provided in this regard that the friction lining segments 8 are not arranged entirely on one fastening lug 11 each, but that the friction lining segments 8 and the fastening lugs 11 are arranged alternately in a circumferential direction 12, as can be seen in FIG. 4. In this context, there are overlapping regions 13 between the friction lining segments 8 and the fastening lugs 11 (as viewed in the axial direction 4 (FIG. 1)), in which the friction lining segments 8 are connected to the fastening lugs.

By this arrangement of the fastening lugs 11 and the friction lining segments 8, a ring element consisting of the friction lining segments 8 and the fastening lugs 11 and being continuous in the circumferential direction 12 is formed, as can also be seen from FIG. 4.

Thus, in the embodiment variant of the friction device shown in FIG. 4, two fastening lugs 11 are in each case connected to one another in the circumferential direction 12 via one friction lining segment 8. However, in this regard, it is not obligatory for a continuous ring element to be formed, as has been described above, but there can also be empty spaces. For example, each second friction lining segment 8 (as viewed in the circumferential direction 12) can be not present, for example those friction lining segments 8 marked with an "x" in FIG. 4.

According to another embodiment variant of the friction device, sections of which are shown in FIG. 5 (can also be referred to as clutch disc), it is possible that the friction disc has a rigid side (right side in FIG. 5) and a flexible side (left side in FIG. 5). The rigid side may be designed in the form of a flat carrier element 5 or in the form of flat fastening lugs 11. The flexible side can for example be designed in the form of angles fastening lugs 11, so-called lining spring elements, such that a distance is formed between the fastening lugs 11 of the right and of the left side.

It should be noted that the right and the left side of the friction device are formed behind one another in the axial direction 4.

The angles fastening lugs 11 can also consist of a steel, for example a spring steel.

The fastening lugs 11 of the right and the left side can be connected to one another, for example via a rivet 14, as is adumbrated in FIG. 5, or a screw etc. Furthermore, they are connected to the rest of the carrier elements 5, for example riveted or screwed etc.

Additionally, it should be noted that torsion springs 15 can be arranged in or on the carrier element 5, in particular in the embodiment variant of the friction device according to FIG. 5. The arrangement of such torsion springs 15 in clutch discs is per se known, such that reference is made to the relevant prior art in view of further details.

It should be noted that mixed variants of the individually represented embodiment variants of the friction device in FIGS. 2 to 5 are possible as well. In particular, fastenings of the friction lining segments 8 can also be accordingly selected from the other embodiment variants. For example, the continuous ring element formed of the fastening lugs 11 and the friction lining segments 8 above, can also be formed on the right and/or left side (referring to the representation in FIG. 5) in the embodiment of the friction device according to FIG. 5.

As explained above, the friction lining segments 8 with inorganic friction linings are provided for replacing organic friction linings and/or for being used in friction discs with an "organic basic structure". For this purpose, the friction lining segments 8 can be of different designs. FIGS. 6 to 10 show some examples of friction lining segments 8.

Organic friction linings are always designed as closed rings in clutches, which is why in clutches, they are also referred to as friction discs. However, sintered friction linings are designed as segments. The different designs for "organic basic structures" and "inorganic basic structures" results from these requirements. Closed rings allow for the use of tangentially curved lining spring elements, which offer advantages in terms of spring suspension, contact pattern, speed-dependent geometric deformations and thus air clearance. Lining spring elements in sintered segments are predominantly curved radially. Causes are manufacturability, shape, size in combination of riveting of the friction lining on the spring segment. As explained above, it is possible by means of the invention to use inorganic friction lining segments in such an "organic basic structure", in particular in an "organic basic structure" with tangentially curved lining spring elements.

Preferably, each friction lining segment 8 of the friction device comprises a sintered friction lining 16 and a friction lining carrier 17 and/or consists thereof. However, it is also possible to combine these friction lining segments 8 with other friction lining segments than those described in the present description. For example, one of the two sides of the friction device according to FIG. 5 can be provided with other friction lining segments 8 than those described.

Below, merely one friction lining segment 8 will be described. However, the embodiments in this regard can be applied to all friction lining segments 8 of a friction device or a side of the friction device.

The sintered friction lining 16 is arranged on the friction lining carrier 17 and connected thereto, for example sintered or glued on. Moreover, the friction lining segment 5 with the friction lining carrier is (releasably) connected, in particular riveted, to the carrier element 5, in particular to at least one fastening lug 11.

Sintering materials for sintered friction linings are per se sufficiently known, such that statements in this regard can be dispensed with.

The friction lining carrier 17 is preferably made of a steel.

According to a preferred embodiment variant of the friction disc, which is to be considered as an alternative or addition to the embodiment variant described above, in which in each case two fastening lugs 11 are connected to one another with the friction lining segments 8, the friction lining segment 8 has an angle coverage between 25° and 55°, in particular between 30° and 50°. In this context, the angle coverage is that region of a circular ring which encloses an angle 18 in this region. The friction lining segment 8 according to FIG. 6 for instance has an angle coverage of 50°, meaning that the angle 18 amounts to 50°.

In the simplest embodiment variant of the friction lining segment 8, it is designed as a circular ring section, as is shown in FIG. 6. In this regard, a radial width 19 of the friction lining segment 8 remains the same across the entire extension in the circumferential direction 12. However, according to embodiment variants of the friction device, it is also possible that this radial width 19 does not remain constant but varies. In this regard, both the friction lining carrier 17 and the sintered friction lining 16 can have a varying radial width. However, it is also possible that merely the friction lining carrier 17 changes with respect to its radial width 19 in the course of the circumferential direction 12.

Hence, it is possible for instance that the friction lining carrier 17, as in the friction lining segment 8 according to FIG. 7, has at least two radially projection lugs 20, in particular projecting radially outwards, which are in particular formed as one piece with the rest of the friction lining carriers 17. In the alternative or in addition to this, the friction lining carrier 17 can have one or multiple such lugs 20 which project radially inwards and/or project in the circumferential direction 12. The sintered friction lining 16, in contrast, is formed having a constant radial lining width 21. The lugs 20 serve for fixing the friction lining segments on the carrier element 5, in particular on the fastening lugs 11 of the carrier element 5. Thus, the friction lining carrier has fastening lugs on which no friction linings are arranged.

FIG. 8 shows the reverse case. In this friction lining segment 8, a radial friction lining carrier width 22 remains unchanged in the circumferential direction 12, while the lining width 21 of the sintered friction lining 16 varies in the circumferential direction 12. In concrete terms, the sintered friction lining 16 has two lug-like (wing-like) regions 23, 24 projecting in the circumferential direction 12, in which the lining width 21 is smaller than in the remaining regions of the sintered friction lining 16. In this regard, the radial width of the region 23 can be equal to or not equal to the radial width of the region 24.

Furthermore, the longitudinal extension in the circumferential direction 12 of the region 23 can be smaller or larger than the longitudinal extension in the circumferential direction 12 of the region 24.

However, according to an embodiment variant, for this purpose, the two regions 23, 24 can also have the same length in the circumferential direction 12, as shown in the friction lining segment 8 according to FIG. 9. In addition, this embodiment of the friction lining segment 8 also shows very nicely that combinations of the individual embodiment variants of the friction lining segments 8 are possible. Thus, the friction lining segment 8 according to FIG. 9 has lugs 20, as described for FIG. 7, which can also be of unequal size. Thus, the friction lining carrier 17 can also have a radial friction lining carrier width 22 that varies in the circumferential direction 12. The region of the friction lining segment 8 shown on the left in FIG. 9 can be obtained from the embodiment variant of the friction lining segment 8 according to FIG. 8.

It should also be noted that the embodiment variant of the friction lining segment 8 according to FIG. 8 has an angle coverage of approximately 32°.

It should also be noted that in all embodiment variants of the friction lining segment 8, the corners of the sintered friction lining 16 and/or the corners of the friction lining carrier 17 may be rounded, as shown in FIGS. 6 to 10. However, the change in the radial width of the sintered friction lining 16 and/or of the friction lining carrier 17 related thereto is not assigned to the aforementioned change in the radial lining width 21 and/or the change in the radial friction lining carrier width 22. The friction lining segment 8 according to FIG. 6 thus—as described—does not have a change in a radial width.

According to another embodiment variant of the friction device, the friction lining segment 8 can comprise at least one recess 25 in the sintered friction lining 16 and/or in the friction lining carrier 17, as shown inter alia in FIG. 10. In this regard, the recess 25 can be located in the region of the circumference of the friction lining segment 8, as shown by the four peripheral recesses in FIG. 10. However, it is also possible for the recess 25 to be formed within the sintered friction lining 16 and/or the friction lining carrier 17, as also shown in FIG. 10 by the central recess 25 in the sintered friction lining 16 and in the friction lining carrier 17.

In this regard, it is possible that the recesses 25 in the sintered friction lining 16 and in the friction lining carrier 17 are located on top of one another as viewed in the axial direction 4 (FIG. 1). However, they can also be formed to be offset from each other, so that the recess 25 in the friction lining carrier 17 can thus be at least partially covered by the sintered friction lining 16.

Furthermore, in the sintered friction lining 16 recesses 25 can be provided which are larger than the recesses 25 in the friction lining carrier at the location of the recesses 25 in the sintered friction lining 16. Preferably, this applies to those regions in which the friction lining segments 8 are (releasably) fastened, in particular riveted, on the carrier element 5 and/or the fastening lugs 11. Hence, as is shown in FIGS. 6, 7 and 10, in these regions the sintered friction lining 16 can be designed having an elongated hole 26 and the friction lining carrier 17 can be designed having at least one bore 27. In this regard, it is also possible that more than one bore 27 per elongated hole 26 is provided, for example two, wherein these bores 27 can have different diameters.

The formation of the recesses 25 may go so far as to divide the one sintered friction lining 16 per friction lining carrier 17 into at least two separate sintered friction linings 16. In other words, more than one sintered friction lining 17, for example two, may be arranged per friction lining carrier 17 and connected to the friction lining carrier 17.

By forming the at least one recess 25 in the sintered friction lining 16 and/or in the friction lining carrier 17, the mass of the friction lining segment 8 can be reduced while maintaining the same size of the friction lining segment 8.

Preferably, according to an embodiment variant of the friction disc, the sintered friction lining has an areal extent which is smaller by at least 5%, in particular between 5% and 25%, than the areal extent of the friction lining carrier 17, in each case as viewed in a top view.

A reduction in mass of the friction lining segment 8 may alternatively or additionally be achieved by a reduction of the lining thickness of the sintered friction lining 16 and/or the thickness of the friction lining carrier 17 (each as viewed in the axial direction 4).

The exemplary embodiments show possible embodiment variants of the friction device, while it should be noted at this point that combinations of the individual embodiment variants are also possible.

Finally, as a matter of form, it should be noted that for ease of understanding of the structure of package 1 of friction devices and/or the friction device are not obligatorily depicted to scale.

LIST OF REFERENCE NUMBERS 1 package
2 inner disc
3 outer disc
4 axial direction
5 carrier element
6 surface
7 surface
8 friction lining segment
9 disc body
10 bore
11 fastening lug
12 circumferential direction
13 overlapping region
14 rivet
15 torsion spring
16 sintered friction lining
17 friction lining carrier
18 angle
19 width
20 lug
21 lining width
22 friction lining carrier width
23 region
24 region
25 recess
26 elongated hole
27 bore

The invention claimed is:

1. A friction device comprising:
a carrier element; and
a plurality of friction lining segments arranged on the carrier element;
wherein the carrier element comprises a plurality of pairs of lining spring elements, each pair of the plurality of pairs of lining spring elements comprising a flat fastening lug and an angled fastening lug spaced a distance apart from a respective flat fastening lug in an axial direction of the carrier element;
wherein the plurality of pairs of lining spring elements extend radially outwardly from an outer circumference of the carrier element and are distributed around the outer circumference of the carrier element with a respective space between circumferentially adjacent pairs of the plurality of pairs of lining spring elements such that a respective gap is formed between the flat fastening lug of a first pair of the plurality of pairs of lining spring elements and the flat fastening lug of a second, circumferentially adjacent pair of the plurality of pairs of lining spring elements and between the angled fastening lug of the first pair of the plurality of pairs of lining spring elements and the angled fastening lug of the second, circumferentially adjacent pair of the plurality of pairs of lining spring elements;
wherein each of the plurality of friction lining segments comprises a respective sintered friction lining arranged on a respective friction lining carrier connected to the carrier element;
wherein each friction lining segment of the plurality of friction lining segments connects a respective flat fastening lug of the first pair of the plurality of pairs of lining spring elements to a respective flat fastening lug of the second, circumferentially adjacent pair of the plurality of pairs of lining spring elements or connects a respective angled fastening lug of the first pair of the plurality of pairs of lining spring elements to a respective angled fastening lug of the second, circumferentially adjacent pair of the plurality of pairs of lining spring elements;

wherein the plurality of friction lining segments and the plurality of pairs of lining spring elements are arranged alternately in a circumferential direction of the carrier element, forming overlapping regions of a friction lining segment of the plurality of friction lining segments and the flat fastening lug or the angled fastening lug of the plurality of pairs of lining spring elements as viewed in the axial direction of the carrier element;

wherein a respective friction lining segment of the plurality of friction lining segments is connected to a respective flat fastening lug or a respective angled fastening lug of the plurality of pairs of friction lining segments in a respective overlapping region of the overlapping regions; and wherein each friction lining segment of the plurality of friction lining segments has an angle coverage between 25° and 55°.

2. The friction device according to claim 1, wherein the plurality of friction lining segments and the flat fastening lugs or the angled fastening lugs of the plurality of lining spring elements form a continuous ring element.

3. The friction device according to claim 1, wherein the friction lining carriers have fastening lugs on which no sintered friction linings are arranged.

4. The friction device according to claim 1, wherein the friction lining carriers and/or the sintered friction linings have recesses.

5. The friction device according to claim 1, wherein the friction lining carriers have multiple bores, wherein at least one of the bores has a diameter differing from that of the remaining bores.

6. The friction device according to claim 1, wherein each of the sintered friction linings have an areal extent which is smaller by at least 5% than an areal extent of the respective friction lining carrier as viewed in a top view.

7. The friction device according to claim 1, wherein the sintered friction linings are provided with lug-like regions projecting in the circumferential direction of the carrier element.

8. The friction device according to claim 1, wherein the friction device comprises a friction disc or a clutch disc.

9. A package of friction devices comprising friction devices in the form of outer discs and inner discs arranged alternately in an axial direction, wherein at least one of the friction devices comprises a friction device according to claim 1.

* * * * *